United States Patent [19]
Heitkamp

[11] Patent Number: 5,911,545
[45] Date of Patent: Jun. 15, 1999

[54] METHOD FOR STABILIZING AND REPAIR OF DOCKS AND SEAWALLS

[76] Inventor: Roy S. Heitkamp, 23335 Lowe Davis Rd., Covington, La. 70435

[21] Appl. No.: 09/159,205

[22] Filed: Sep. 23, 1998

[51] Int. Cl.$^6$ .............................. E02D 3/02; E02D 5/02; C09K 17/00; E04B 1/00
[52] U.S. Cl. ...................... 405/275; 405/266; 405/274; 52/741.4; 52/742.16
[58] Field of Search ................... 52/514, 514.5, 52/741.4, 741.41, 742.16; 405/152, 270, 258, 263, 266, 267, 274, 275, 279, 229

[56] References Cited

U.S. PATENT DOCUMENTS

| | | |
|---|---|---|
| 3,783,624 | 1/1974 | Nakade et al. ...................... 405/264 |
| 4,567,708 | 2/1986 | Haekkinen . |
| 4,744,193 | 5/1988 | Hatsuzaki et al. ............... 52/742.16 X |
| 5,253,957 | 10/1993 | Fujikawa ............................. 52/742.16 |

*Primary Examiner*—Tamara Graysay
*Assistant Examiner*—Sunil Singh
*Attorney, Agent, or Firm*—Juan J. Lizarrga

[57] ABSTRACT

A method for stabilizing and repairing whereby components are mixed to form an expandable foam which is injected under pressure in an expanded state behind or into the backfill material of an existing sheetpile seawall. Upon expansion, the foam displaces water and fills and seals cracks in the seawall and fills scoured voids in the backfill material. The method is also applied to rock revetment seawalls whereby the unexpanded foam is injected under pressure into the rock revetment. Upon expansion, the foam displaces water and fills and seals spaces in the rock revetment and interlocks the rock revetment.

10 Claims, 4 Drawing Sheets

METHOD FOR STABILIZING AND REPAIR OF DOCKS AND SEAWALLS

FIELD OF THE INVENTION

The present invention relates to a method for the stabilization and repair of existing docks and seawalls by the injection of a polymeric foam mixture into and behind seawalls.

BACKGROUND OF THE INVENTION

The never ending erosive effect of waves, tides and storms on docks, piers and shorelines has given rise to numerous methods of structure and reinforcement. Along the many miles of "waterfront" property now common in the coastal areas of the United States and other parts of the world, many types of structures have been used to contain and keep the land from slipping into the sea, and also provide a suitable pier for the mooring of boats and watercraft. Among the most common structure used is a continuous seawall made of sheetpile, which sheetpile is either concrete or wooden panels. These panels normally extend one to two feet below the existing water/sea-bed at the time of original installation. This type of seawall is normally topped with a continuous concrete pile cap which secures the top of the sheetpile, provides a usable walking surface and also is used as an anchor point and horizontal structural member for a metallic tie-back rod on the landside of the seawall. With one end anchored in the pile cap, the land end of the tie back rod is secured in a concrete thrust block which is buried. This type of seawall is normally reinforced on the inland side of the sheetpile with backfill material such as rip-rap, limestone or other rock and sand packing. This backfill material is then covered with grass sod to give a usable attractive surface. Over a period of time, cracks will develop where the sheetpile panels abut and tidal surges and wave action will filter through the seawall and begin to scour the backfill material behind the seawall and wash away the sand and fines packed around the rip-rap, limestone or other rock in the backfill material. The action of the water will also deposit the exfiltrate sand and fines scoured from the landside of the seawall on the seaside, thereby lessening the water depth and making the seawall unusable for mooring watercraft. The water action will also cause the cracks between the sheetpile panels to increase in size, thereby accelerating the scouring process. Because the water action scours the backfill material behind the seawall, voids are created between the rip-rap and limestone, causing it to settle along with the sod at ground level. This settling process also exposes the tie back rod.

Up to now, there are only several solutions to this problem and none of them are permanent, lasting no more than six weeks to a year. Some of these solutions are extremely costly. One of the present solutions is to backfill the voids created behind the seawall on land with limestone or gravel-aggregrate with sand and sometimes without sand. However, this method does not prevent further erosion of the fines beneath the aggregate and is, at best, a temporary solution. Another method is to remove the backfill material such as rip-rap or limestone and sand to expose the landslide of the seawall for the installation of a sealing membrane. Once the membrane is installed the seawall is again backfilled with rip-rap or limestone and sand and resodded or reseeded as necessary. Although more costly than simply adding backfill as mentioned above, this again is not a permanent solution, simply because the sealing membrane is not installed far enough below the water level to prevent wave and tidal action from infiltrating and continuing to scour. A third method of dealing with the problem is to completely replace the sheetpiling and pilecap which is at least as expensive as the original installation, if not more so. Even after a complete replacement, the inherent problem remains.

In other coastal areas, certain regulatory agencies do not permit continuous sheetpile seawalls but will only allow rock revetment on the shoreline. Rock revetment is essentially the piling of heavy rocks, rip-rap, limestone or similar material at the shoreline to the desired level. Here again the ever constant wave and tidal action removes the sand and fines, resulting in the settling and movement of the rock revetment. This eventually undermines the integrity and frontal protection of the revetment type seawall.

SUMMARY OF INVENTION

The present invention provides an improved, yet simple and reliable, method for stabilizing and repairing sheetpile and rock revetment type seawalls which will circumvent the problems associated with the presently available methods. The present invention provides an environmentally safe method and will not require excavation and backfilling with heavy equipment.

The present invention provides a method for the stabilization and repair of sheetpile seawalls supported on the land with backfill material comprising the steps of mixing components such as a blended polyol water soluble mixture with a isocyanate fluid to form an expandable polymeric foam mixture which is then injected under high pressure through an injection gun into a nozzle attached to a probe, which probe is inserted into the ground into the backfill material support on the land side of the seawall and at regular intervals along the length of the sheetpile seawall, further comprising the step of allowing the unexpanded mixture to disperse in the voids in the backfill material and cracks and openings in the sheetpile panels. Once dispersed, the mixture expands into a foam which fills voids and seals cracks. The foam can be a polyurethane mixture, preferably of 2.5 to 3 pounds per cubic foot and of sufficient density to produce a 95% closed cell filler, which is in effect impervious to water entrainment. This method thereby seals and simultaneously fills voids in the backfill, seals the sheetpile and can lift the sod back to the level of the pilecap. This foam material has a minimum life of ten years and possibly an indefinite life. The present invention seals the sheetpile and fills the voids in the backfill, making the seawall invulnerable to the erosive action of wave and tide.

The present invention further provides an improved method for stabilization and repair of rock revetment seawalls comprising the same steps as described above for stabilization and repair of sheetpile type seawalls. As applied to rock revetment seawalls, an expandable mixture of foam is injected through an injection gun into a nozzle attached to a probe which is inserted at regular intervals into the heavy fill material used to construct the revetment such as rock, limestone, or rip-rap. Once expanded the foam would seal the voids or interstices of the rock or other heavy fill material, effectively locking and keying the rocks, limestone or rip-rap to one another thereby producing a solid formation to resist the wave and tidal action.

DETAILED DESCRIPTION OF THE INVENTION

Figure 1:
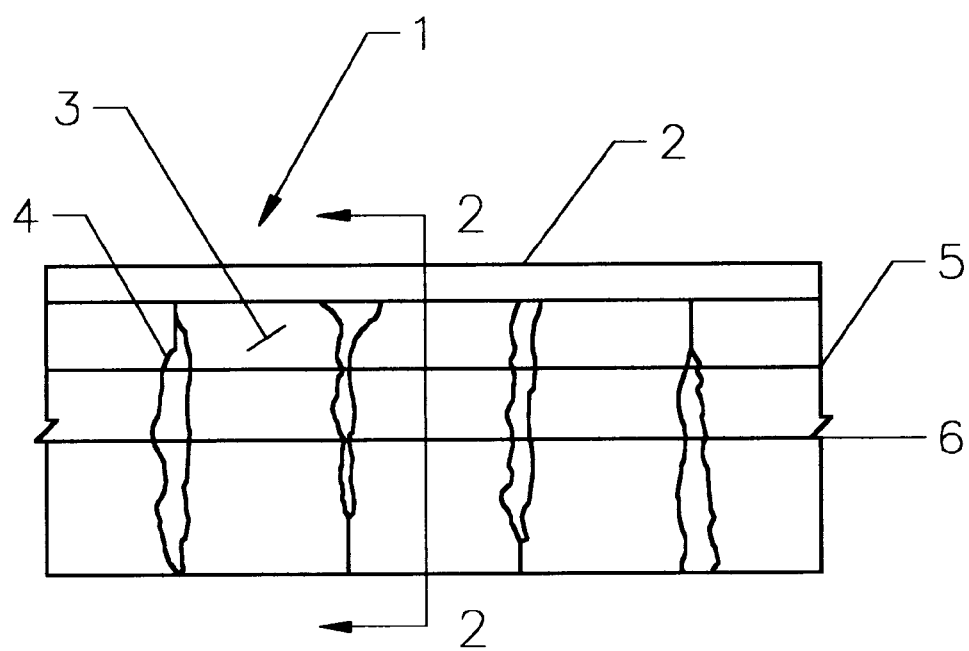
FIG. 1 is a front elevation of a continuous seawall made of sheetpile as seen from the sea side.

A continuous sheetpile seawall 1 is generally illustrated in FIG. 1. The seawall 1 in FIG. 1 is shown in elevation as would be seen from the sea side of the seawall. As shown, the seawall 1 is made up of a series of sheetpile panels 3 which butt against each other. These panels are commonly made of concrete and are typically four feet wide, eight to ten feet high and four inches thick. Another form of sheet pile used is wood in the form of planks, which wood would be normally treated with some form of preservative such as creosote. At the top of the sheetpile panels 3 is typically a pile cap 2 which serves to lock the adjoining sheetpile panels 3 together, provides a usable walking space at the top of the seawall 1, and provides an anchor point for supports attached to the land side of the seawall 1. The pile cap 2 is typically made of concrete and approximately ten inches thick and fourteen to sixteen inches wide. For reference, the water level at high tide 5, and the water level at low high tide 6 are also shown. Where the sheet pile panels abut, cracks 4 will develop due to the scouring action of waves and tides.

Figure 2:
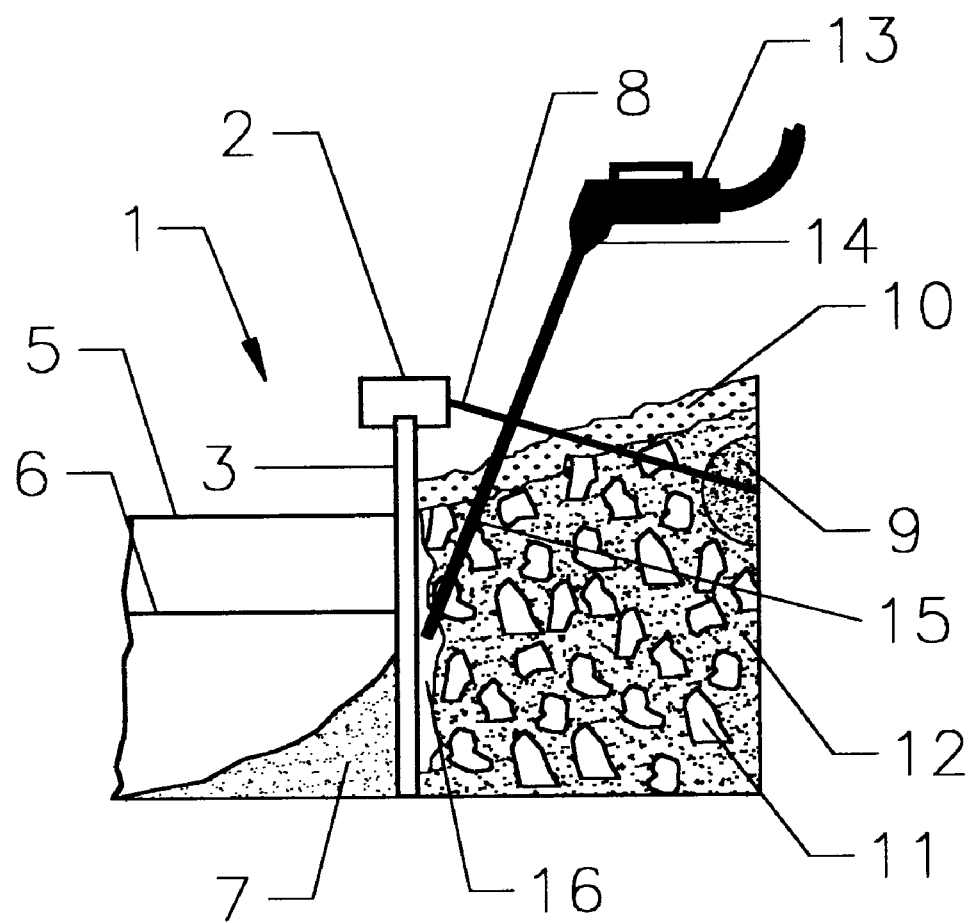
FIG. 2 is a cross section of a continuous seawall made of sheetpile taken in the direction of the arrows 2—2 in FIG. 1, after being subjected to wave and tidal action.

FIG. 2 is a cross section of the seawall 1 in the direction of the arrows 2—2 in FIG. 1 which illustrates the scouring effect of the waves and tides on the structure and support of the seawall 1. As shown in FIG. 2, the tie-back rod 8 is attached to the pile cap 2 at the top of the seawall 1. The other end of the tie-rod 8 is anchored in a concrete thrust block 9. Due to the scouring action of the waves and tides acting through the cracks 4 between the sheet pile panels 3, exfiltrate sands and fines 7 have been removed from the backfill material 21 and deposited on the sea bottom adjacent to the seawall 1. The removal of these sands and fines 7 cause the backfill material 21 to settle causing the sod 10 to sink below normal ground level exposing the tie-back rod 8. This settling of the backfill material 21, sinking of the sod 10 and exposure of the tie-back rod cause an unsightly and unsafe walking surface. In addition, the removal of the sands and fines 7 creates voids 16 between the seawall 1 and the backfill material 21 which only hastens further removal of material by waves and tides.

Figure 3:
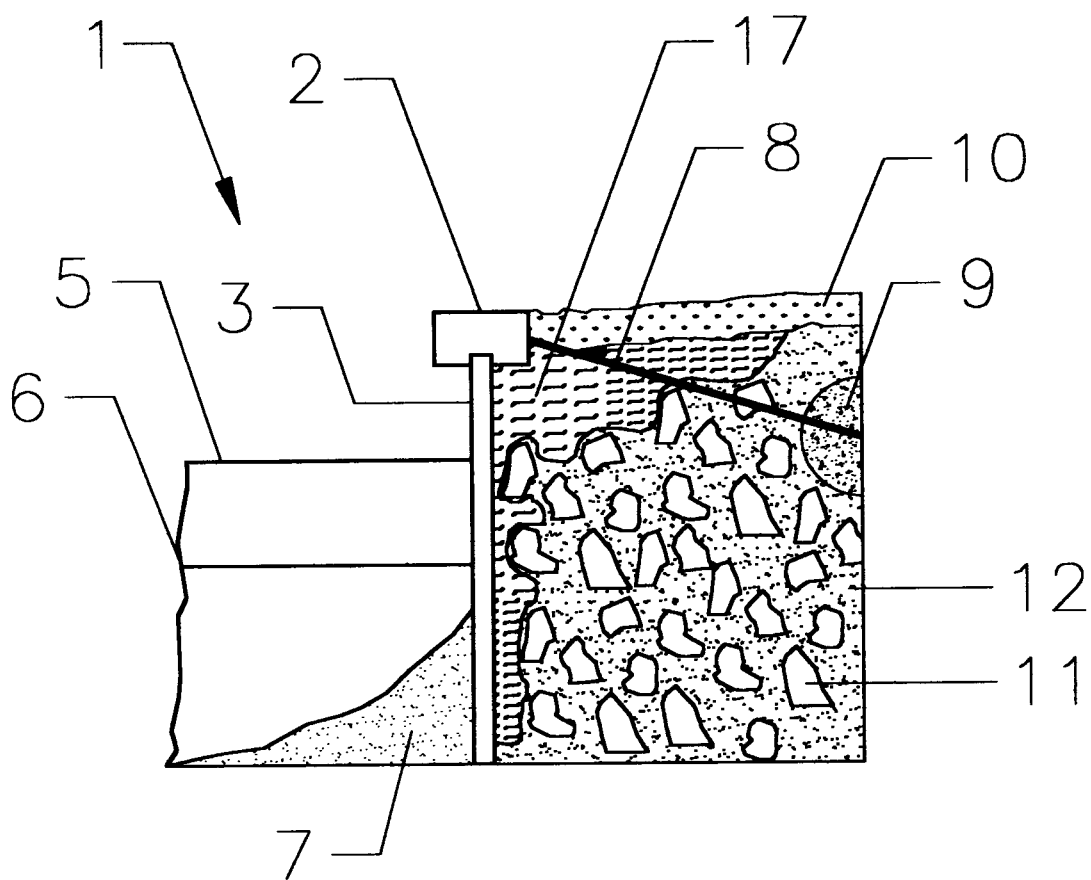
FIG. 3 is a cross section of a continuous seawall made of sheetpile taken in the direction of the arrows 2—2 in FIG. 1, after being stabilized and repaired by the method described in the present invention.

The present invention corrects these various problems as illustrated in FIG. 3 which is a cross section of the seawall 1 shown in FIG. 1, but after stabilization and repair by the method of the present invention. In FIG. 3, the sod 10 has been lifted to normal ground level which is level with the top of the pile cap 2, and the tie-back rod 8 is completely covered. The voids 16 between the seawall 1 and the backfill material 21 are filled with an expanded foam 17, which foam 17 has also raised the sod 10 to a desired level and sealed and filled the cracks 4 between the sheetpile panels 3. Referring back to FIG. 2, components such as a blended polyol water mixture and an isocyanate fluid are mixed to form an expandable polymeric foam mixture which is then injected in unexpanded form through a pressurized injection gun 13 into a nozzle 14 attached to a probe 15. The probe 15 is inserted into either or both the void 16 or the backfill material 21 at regular intervals along the seawall 1. The unexpanded pressurized polymeric foam mixture is allowed to disperse in the voids 16 and the cracks 4. Once dispersed, an exothermic reaction begins and the unexpanded foam mixture expands into a polymeric foam 17 which displaces any water and fills and seals any cracks 4 or voids 16. It is preferable that the expanded foam be a polyurethane mixture which produces a density of 2.5 to 3 pounds per cubic foot and of sufficient density to produce a 95% closed cell filler, effectively impervious to water entrainment. Such a polyurethane foam mixture is known to have a minimum of ten years life and possibly more.

Figure 4:
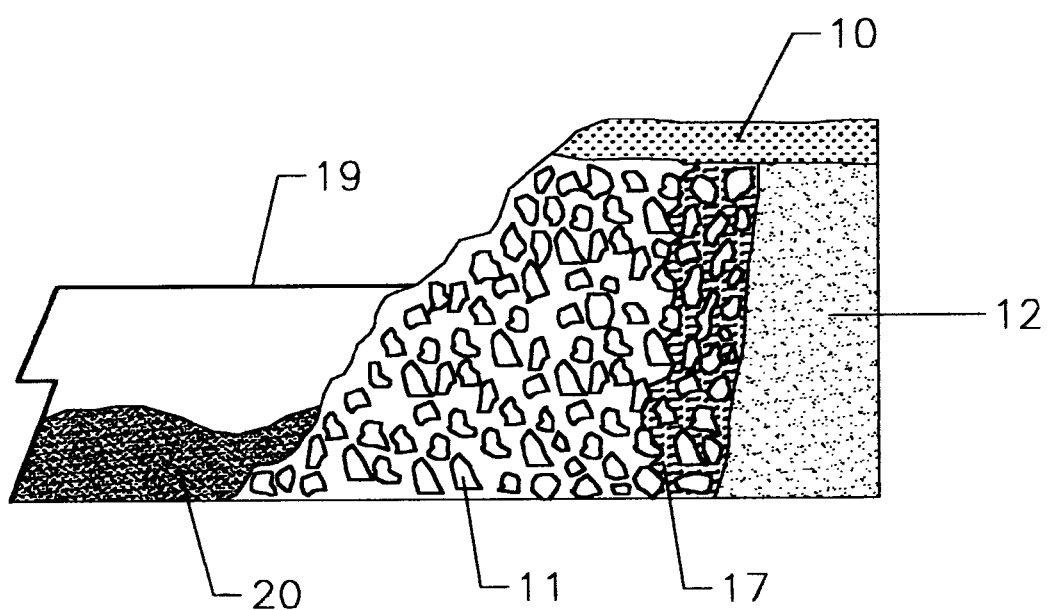
FIG. 4 is a cross section of a rock revetment seawall after being stabilized and repaired by the method described in the present invention.

The method described above is likewise applicable for the stabilization and repair of rock revetment seawalls as shown in FIG. 4 which illustrates a cross section of a rock revetment seawall 18 facing the sea depicted by a mean water level 19 after stabilization and repair according to the method of the present invention. In a typical rock revetment seawall 18, the rock 11 is usually rip rap and limestone which is constantly scoured by the waves and tides. Any sand 12 packed in the rock 11 is leached out and deposited on the sea floor 20. The sand 12 behind the rock 11 is then eroded. The result is a collapse of the shoreline with a drop of the adjacent sod 10 and sand 12 as well as settlement of the rock 11. As described above for stabilizing and repairing continuous sheetpile seawalls 1, an unexpanded foam mixture is injected under pressure through an injector gun 13 through a nozzle 14 to a probe 15 which is inserted into the rock 11 at intervals along the rock revetment seawall 18. The unexpanded foam disperses between the voids or interstices of the rock 11 and then expands to a polymeric foam 17, displacing any water and effectively locking the rock 11 to itself as well as sealing and filling voids, producing a solid formation as a barrier to the scouring action of wave and tide.

We claim:

1. An improved method for stabilizing and repairing sheetpile seawalls made up of a series of sheetpile panels with cracks and leaks between said panels and supported on the land with backfill material comprising the steps of:

mixing components to form an expandable polymeric foam mixture; and injecting the unexpanded mixture of said components behind a portion of said sheetpile seawall whereby the expansion of said foam behind said portion will displace water and fill and seal cracksbetween sheetpile panels of said seawall.

2. A method according to claim 1, wherein said foam is a closed cell polyurethane foam.

3. A method according to claim 1, wherein said backfill material comprises sand, rip rap and limestone.

4. A method according to claim 1, wherein said sheetpile panels are concrete.

5. A method according to claim 1, wherein said sheetpile panels are wood.

6. A method according to claim 1, further comprising the step of injecting said mixture into the backfill material, whereby the expansion of said foam will fill any scoured-out voids in said material.

7. A method according to claim 6, whereby the expansion of said foam will raise any sod on the landside of the seawall.

8. An improved method for stabilizing and repairing rock revetment seawalls comprising the steps of:

mixing components to form an expandable polymeric foam mixture;

injecting the unexpanded mixture of said components into the rock revetment material whereby the expansion of said foam in the rock revetment material will displace water and fill and seal spaces between the rock revetment material and interlock the rock revetment material.

9. A method according to claim 8, wherein said foam is a closed cell polyurethane foam.

10. A method according to claim 8, wherein said rock revetment material comprises rip-rap and limestone.

* * * * *